(12) United States Patent
Yater

(10) Patent No.: US 11,225,268 B2
(45) Date of Patent: Jan. 18, 2022

(54) TOW SYSTEM

(71) Applicant: WesCove, LLC, Palisade, CO (US)

(72) Inventor: Mitchell Yater, Parachute, CO (US)

(73) Assignee: WesCove, LLC

( * ) Notice: Subject to any disclaimer, the term of this patent is extended or adjusted under 35 U.S.C. 154(b) by 197 days.

(21) Appl. No.: 16/150,093

(22) Filed: Oct. 2, 2018

(65) Prior Publication Data

US 2019/0100416 A1 Apr. 4, 2019

Related U.S. Application Data

(60) Provisional application No. 62/566,582, filed on Oct. 2, 2017.

(51) Int. Cl.
| | |
|---|---|
| B61B 11/00 | (2006.01) |
| B61B 12/10 | (2006.01) |
| B66D 3/00 | (2006.01) |
| B66D 1/60 | (2006.01) |
| H02J 7/00 | (2006.01) |
| H02J 7/34 | (2006.01) |
| B66D 5/02 | (2006.01) |
| H02J 7/35 | (2006.01) |

(52) U.S. Cl.
CPC ............ *B61B 11/002* (2013.01); *B61B 12/10* (2013.01); *B66D 1/60* (2013.01); *B66D 3/006* (2013.01); *H02J 7/0013* (2013.01); *H02J 7/345* (2013.01); *B66D 5/02* (2013.01); *H02J 7/34* (2013.01); *H02J 7/35* (2013.01)

(58) Field of Classification Search
CPC ....... B61B 11/002; B61B 11/00; B61B 12/10; B66D 1/60; B66D 3/006; B66D 5/02; H02J 7/0013; H02J 7/345; H02J 7/34; H02J 7/35

See application file for complete search history.

(56) References Cited

U.S. PATENT DOCUMENTS

| | | | | |
|---|---|---|---|---|
| 977,498 A | * | 12/1910 | Bailey | A63J 1/028 |
| | | | | 472/78 |
| 3,011,624 A | * | 12/1961 | Pomagalski | B61B 12/10 |
| | | | | 198/835 |
| 3,456,891 A | * | 7/1969 | Parr | B65H 75/425 |
| | | | | 242/390.8 |
| 3,743,278 A | * | 7/1973 | Rixen | B61B 11/00 |
| | | | | 472/13 |
| 3,835,786 A | * | 9/1974 | McIllwain | B65G 19/025 |
| | | | | 104/172.4 |
| 3,838,647 A | * | 10/1974 | Rixen | B63B 34/63 |
| | | | | 104/53 |

(Continued)

*Primary Examiner* — Michael E Gallion
(74) *Attorney, Agent, or Firm* — Heuton IP Law, LLC

(57) ABSTRACT

A portable tow system includes a drive system for removable mounting to a first anchor point, a flywheel system for removable mounting to a second anchor point distal from the first anchor point, and a tow strap for connecting a drive wheel of the drive system to a flywheel of the flywheel system. One or more persons or objects can be removably attached or connected to the tow strap. The drive system includes a motor for causing the drive wheel to rotate, which rotation causes the tow strap to rotate, such that the person(s) or object(s) connected thereto may be pulled from the first anchor point to the second anchor point or vice versa.

20 Claims, 7 Drawing Sheets

(56) References Cited

U.S. PATENT DOCUMENTS

| | | | | |
|---|---|---|---|---|
| 4,523,525 | A | * | 6/1985 | Foster .................... B61B 11/00 104/117 |
| 5,348,608 | A | * | 9/1994 | Glenn ................ A47G 27/0487 156/717 |
| 6,685,602 | B2 | * | 2/2004 | Colosky, Jr. ......... A63B 21/025 482/122 |
| 9,616,357 | B2 | * | 4/2017 | Sowka .................... B66D 1/60 |
| 2013/0213255 | A1 | * | 8/2013 | Von Lerchenfeld .... B61B 11/00 104/173.2 |
| 2013/0305954 | A1 | * | 11/2013 | Ogden ................. B61B 11/002 104/173.2 |
| 2020/0223456 | A1 | * | 7/2020 | Roy ..................... B61B 11/002 |

\* cited by examiner

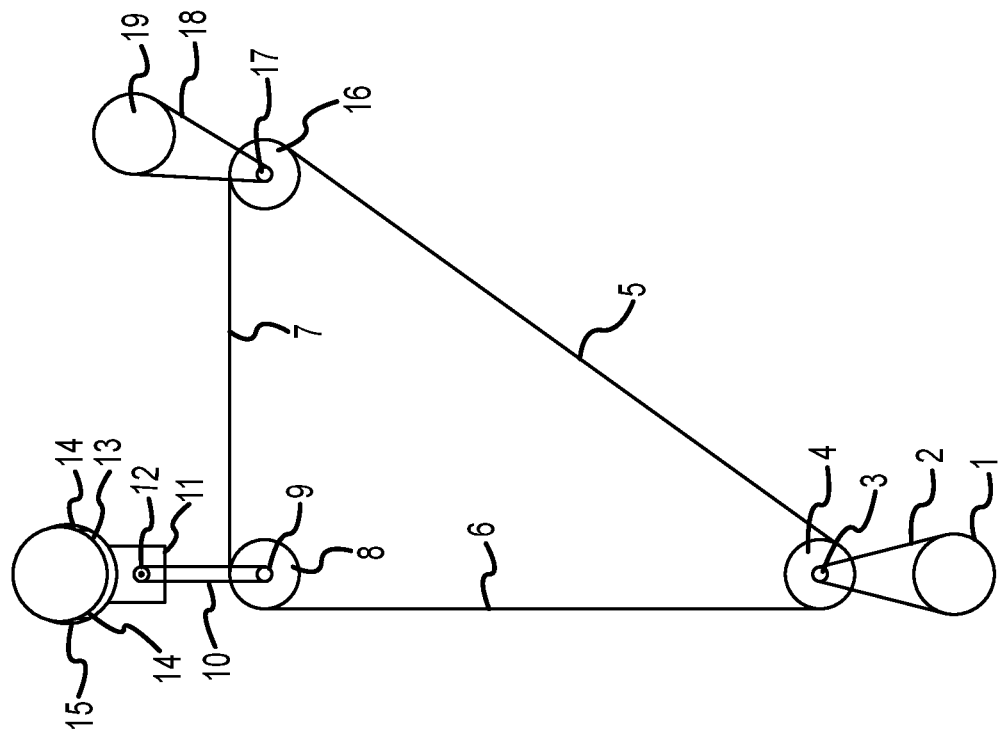
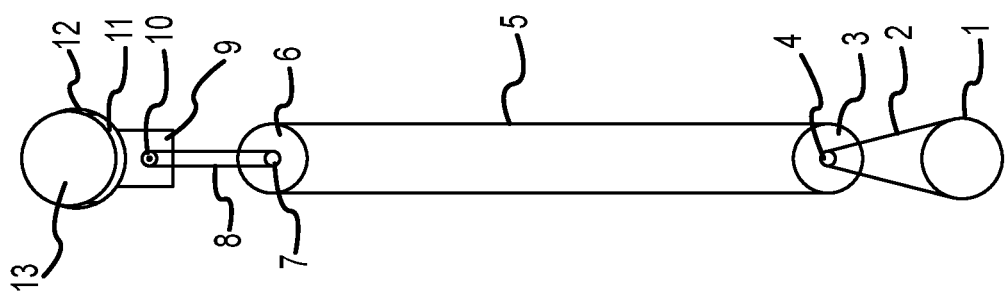

TOW SYSTEM

CROSS REFERENCE TO RELATED APPLICATIONS

This application claims priority to U.S. Provisional Patent Application No. 62/566,582, filed on Oct. 2, 2017, which is incorporated herein by reference in its entirety.

FIELD OF THE DISCLOSURE

The present disclosure relates to transportation systems, and more specifically to a closed loop transportation system for repeatedly transporting people and/or objects from one location to another.

BACKGROUND

Large industries have dominated the current outdoor sport enthusiast transportation system using bulky, extensive, and permanently positioned transportation systems costing the provider and the consumer large sums of money to maintain. In addition, they are stationary systems that inhibit expansion into new terrain and exploration. As a result, a large area of expansive outdoor terrain goes untouched by the current outdoor sports enthusiast. As well as, allowing large ski resorts, through lack of competition, to charge whatever rate they choose. A price that has become inflated to a point that many enthusiasts cannot afford to participate in many outdoor sports.

Recently, through improvements in motor, solar, wind, hydro, and battery technologies, a new opportunity for an alternative outdoor sport enthusiast transportation system has become possible at an affordable cost to consumers. And as well as being affordable, the system offers a reduction of carbon emissions through the utilization of current alternative energy systems. A concept becoming increasingly more important.

Currently, there are independent pull, tow, or winch tools available that allow for ease of transportation of items from one location to another, but there is none designed for a system to transport people and items, multiple times in a row, effectively, in an energy conservative manor.

SUMMARY

The present disclosure relates to an alternative mode of consumer, and consumer item, transportation from one location to another with ease of assembly, operation, and unique power supply methods. The item is designed to transport winter, water, skate, bike, or mountaineering sport enthusiasts or items from one location to another, multiple times, through a system of simple mounting techniques and energy efficient optimization methods making it an ideal alternative to current large industry outdoor sport enthusiast transportation systems.

The present disclosure comprises a closed loop, alternative outdoor enthusiast transportation system designed to pull, tow, or winch consumers or items from one location to another, repeatedly, with ease of assembly. The present disclosure, and its preferred embodiment, will be portable and energy efficient to open up a new range of terrain exploration possibilities at an affordable price. The preferred system embodiment will include the use and combination of modern-day high efficiency motors, winches, battery banks, ropes, straps, bolts, et cetera, to make it an ideal, alternative, outdoor enthusiast transportation system.

A tow system according to one embodiment of the present disclosure comprises: a motor removably mounted to a first anchor point, the motor drivingly connected to a drive wheel attachment rod via a drive belt; a drive wheel connected to the drive wheel attachment rod and configured to be driven by the drive belt; a flywheel removably secured to a second anchor point distal from the first anchor point; and a tow strap extending around the drive wheel and around the flywheel, the tow strap configured to be driven by the drive wheel and to drive the flywheel.

The tow system may further comprise a winch removably secured to the first anchor point, the winch comprising a winch cable and terminating in a winch handle. The tow system may further comprise a second flywheel removably secured to a third anchor point distal from the first and second anchor points, and the tow strap may further extend around the second flywheel and may be configured to drive the second flywheel. The tow system may further comprise a battery for supplying power to the motor. The tow system may further comprise a photovoltaic panel configured to convert solar energy into electrical energy. The photovoltaic panel may be in electrical communication with the battery for charging the battery. The tow system may further comprise a fuel-powered generator configured to generate electricity, and the fuel-powered generator may be in electrical communication with the battery for charging the battery. The motor may comprise at least one mounting plate. The motor may be removably mounted to the first anchor point with at least one anchor strap via the at least one mounting plate.

The motor may be drivingly connected to a gearbox, and the gearbox is drivingly connected, with or without a clutch, to a delivery system drive rod. The tow strap may comprise at least one handle extending therefrom. The winch may be removably secured to the first anchor point with at least one anchor strap. The winch may be configured to be controlled via radio control signals, and further wherein the winch handle comprises a control unit, the control unit comprising at least one control interface and a transmitter for selectively transmitting radio control signals.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

FIG. 1 depicts a top plan view of a tow system according to one embodiment of the present disclosure;

FIG. 2 depicts a top plan view of a tow system according to another embodiment of the present disclosure;

DETAILED DESCRIPTION

Figure 4:
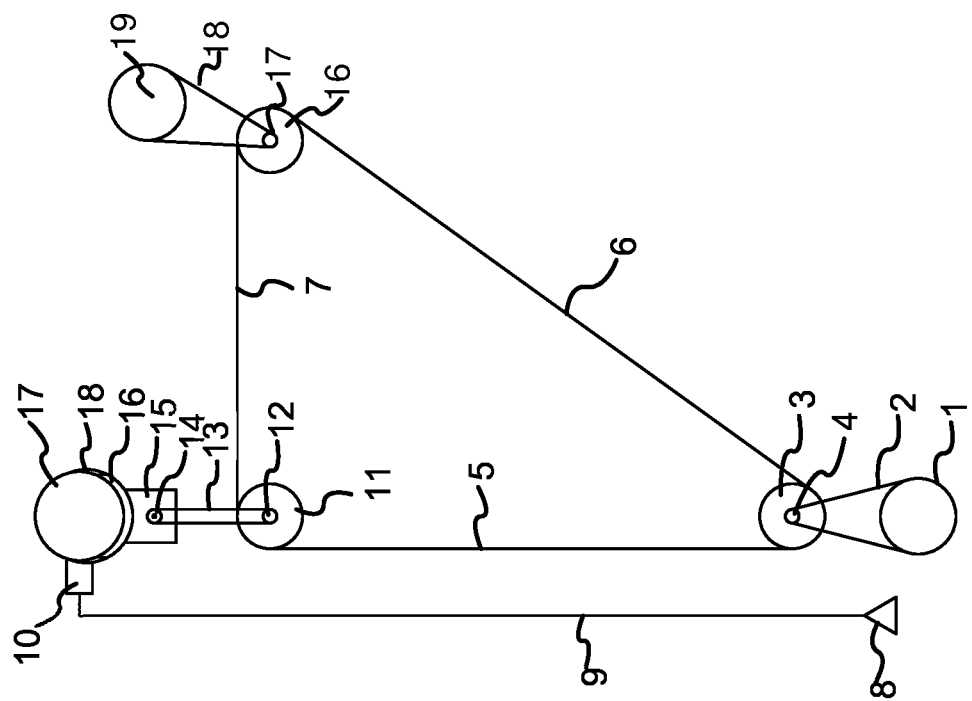
FIG. 4 depicts a top plan view of a tow system according to still another embodiment of the present disclosure.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Unless otherwise defined, all terms (including technical and scientific terms) used herein have the same meaning as commonly understood by one having ordinary skill in the art to which this disclosure belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the disclosure, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the disclosure and the claims.

According to one embodiment of the present disclosure, a tow system is comprised of a lifting or pulling element capable of generating enough power to lift or pull at least one person, or one heavy item, at a time, in a repeatable fashion. In the instance of a stand-alone revolving rope system, a motor, electric or otherwise, would be mounted at the desired location, powering a belt and wheel system to pull or tow items or persons. The mounting system would primarily comprise, but is not limited to, a mounting bracket capable of being mounted to a tree or other solid object, existing or otherwise, through an attachment system comprising one or all of the following components: straps, ratchets, rope, bungees, metal, bolts, bolting harness, etc.

The belt, wheel and pulley system of the revolving motor, designed to pull or tow one or more persons or items to a desired location, comprises without limitation an attachment of one, or any combination of all of the following: wheels, belts, rope, straps, pulleys, etc.

In terms of the belt system as an assembly, the motor will be attached to a gearbox that will allow the motor to spin an initial drive wheel system at a desired revolution per minute (rpm). The drive wheel will then attach to a rotation delivery wheel that will spin the rope, strap, or cable tow system at a desired speed. Once the desired speed is obtained of the rotation delivery wheel, it will revolve the rope, strap, or cable delivery system from the start to end point of the closed loop rotation delivery system. Multiple anchoring points may be used to support some or all the revolving rope, strap, or cable delivery system.

In the instance of a single pull winch delivery system, a winch would be mounted or anchored, below or near the electric motor, at the same mounting point, or another, with a mounting system similar to the one described above for the motor. The single pull winch delivery system may comprise one or more of the following: straps, ratchets, rope, bungees, metal, bolts, bolting harness, etc.

In the case of a winch system being attached on the same, or near to, the anchor position of the motor or wheel system, when the winch has extended itself to the intended start location, the person or item will use the winch to arrive at the desired end location, and then attach the winch handle or hook to be revolved back to its initial start point to be re-engaged again for continuous usage. In a preferred representation of the winch system, the handle itself will be wired to the winch, capable of controlling the speed of the winch as well as engaging and disengaging its pull; i.e., on or off. This is a preferred method of winch control but not limited to this scenario. Also, in a preferred winch pull system, the winch speed will be capable of not only providing basic transportation speed but also speeds of higher rates for a multitude of other recreational values to consumers.

In the case of energy supply to all possible pull, tow, or lift combinations of this disclosure, a primary power supply for the tow system may comprise one or more energy sources or input devices. By way of example but not limitation, the energy supply may comprise a battery bank charged by alternative energy solutions such as solar, wind, or hydro. Gas-generated electricity or kinetic energy may supplement such an energy supply for additional workload capacity, or vice versa. In some embodiments, multiple energy adaptation solutions or energy sources may be utilized to provide a harmonious blend of alternative energy that will help to at least partially reduce carbon emissions, while also providing adequate power for transportation. In other embodiments, an entirely gas-powered system without the use of a battery bank, solar power, or other alternative energy source may be used. Such embodiments may be useful, for example, in high power output demand scenarios and when there is not enough viable alternative energy (e.g., in locations with adequate sunlight to generate enough solar energy), or when workload demands are higher than what a stand-alone alternative energy system can produce.

With respect to FIG. 1, a tow system according to one embodiment of the present disclosure is configured to move people or objects from a first location to a second location. At the first location, an anchor strap 2 is removably secured to an anchor point 1 as well as a fly wheel attachment rod 4. The anchor point 1 may be a tree, a pole, a substantially immovable rock, a concrete pillar, or any other object or structure sufficiently strong to withstand the forces imposed thereon by the tow system.

The fly wheel attachment rod 4 supports a fly wheel 3. At the second location, motor attachment and anchor straps 11 and 12 are removably secured to an anchor point 13 and support a motor 9. The motor 9 may comprise a gearbox. In this and other embodiments described herein, the tow system employs a gearbox 9 to control the application of power output from the motor 9. Conventional transmissions include a gearbox comprising one or more gears that can be selectively engaged with a power input shaft at a number of gear ratios. The crankshaft, or other rotating member or coupling, of a motor may serve as the power input shaft to the transmission. The transmission and gearbox can provide an output speed, torque, power, or other mechanical characteristic that is different from, or the same as, that provided by the power input shaft of the motor. The power output from the transmission is provided, in some form, to the motor drive wheel, or wheels, of the tow system. The motor 9 drives a drive belt or timing belt 8, which transfers energy from the motor 9 to a drive wheel 6 via a drive wheel attachment rod 7. The drive wheel 6 drives a tow strap or delivery belt 5, which runs between the drive wheel 6 and the fly wheel 3. Thus, when the tow system of FIG. 1 is in operation, the motor 9 imparts rotational energy to the drive belt or timing belt 8, which in turn imparts rotational energy to the drive wheel 6. As the drive wheel 6 rotates, the drive wheel 6 causes the tow strap or delivery belt 5 to rotate, and the flywheel 3 facilitates such rotation. If a person or object is attached or otherwise secured to the tow strap or delivery belt 5 at the first location, the rotation of the tow strap or delivery belt 5 will pull the person or object to the second location, and vice versa. As persons of ordinary skill in the art will appreciate, the person or object should be attached or otherwise secured to the tow strap or delivery belt 5 at a point along the direction of rotation where the tow strap or delivery 5 has already passed the drive wheel 6 (if at the second location) or the flywheel 3 (if at the first location).

The various components of the tow system of FIG. 1, and of the other tow systems described herein, may be selected based on the intended uses of the tow system. For example, for tow systems intended to pull heavy persons or objects up an incline, the motor, cables, and other components may be sized accordingly. For tow systems intended to pull relatively light persons or objects, and/or to pull persons or objects across a relative flat surface or even down a decline, the motor, cables, and other components may be relatively smaller and/or have relatively less strength than the tow systems intended for more heavy duty use.

In this and other embodiments described herein, it may be desirable to provide a brake and/or throttle in the drive system, especially in view of the various components selected based on the intended use of the tow system. For example, the speed of the motor drive rod 10 may be determined by a throttle arrangement on the motor 11. The motor 11 is preferably adapted to operate at either an idle or at the optimum speed, with the speed of the tow strap 5 being determined by the sizes and ratios of the various wheels to be used. Further, the speed of the motor drive rod 10 may be determined by a braking arrangement on the system employed to slow the speed of the tow strap 5 at various times. Such variability of the speed of the tow strap will lower the chance of failure of the system and injury to users of the tow system. For example, variability of speed will lessen the chance of fraying, tearing, kinking, bird caging, or slipping of the tow strap 5, especially in view of the relative weight of the persons or objects being towed via the system. Further, the speed of the tow strap 5 may serve as a feedback signal to the system to create automatic throttling and/or braking to maintain the ideal level of slack or tautness on the tow strap 5.

By removably securing the flywheel 3 and the motor 9 to anchor points, the tow system of FIG. 1 (as well as the other tow systems described herein) are portable, and may installed and/or uninstalled as occasion requires. The portable nature of the tow systems described herein permits the use of such tow systems in places and environments where permanent tow systems have not been and/or cannot be installed, and further allows such tow systems to be removed after use, so as to avoid any permanent impact to the environment and/or scenery.

Turning now to FIG. 2, a tow system according to another embodiment of the present disclosure comprises a tow strap or delivery belt (portions of which are identified by reference numerals 5, 6, and 7) that runs among first, second, and third locations. At the first location, an anchor strap 2 is removably secured to an anchor point 1 as well as a fly wheel attachment rod 4. The fly wheel attachment rod 4 supports a fly wheel 3. At the second location, motor attachment or anchor straps 14 removably secure a motor 11 (which may comprise, for example, a gearbox) to anchor points 13 and 15. A motor drive rod 12 transfers rotational energy from the motor 11 to a drive belt or timing belt 10, which in turn transfers rotational energy to a drive wheel 8 via a drive wheel attachment rod 9. At the third location, one or more fly wheel attachment straps 18 removably secure a flywheel 16 (via a fly wheel attachment rod 17) to an anchor point 19. Thus, during operation of the tow system of FIG. 2, the tow strap or delivery belt (comprising the portions 5, 6, and 7) is driven by the drive wheel 8, while the fly wheels 4 and 16 maintain tension in and support the tow strap or delivery belt, while facilitating the rotation thereof. In some embodiments, the portion 6 of the tow strap or delivery belt is intended to pull a person or object from the first location to the second location or vice versa (depending on the direction in which the motor 11 operates), while the portions 5 and 7 are provided only to return an attachment point that has reached the first or second location to the second or first location, respectively. In other embodiments, the portions 5 and 7 may also be used to pull one or more persons or objects between the first location and the third location, and between the third location and the second location, respectively.

Figure 3:
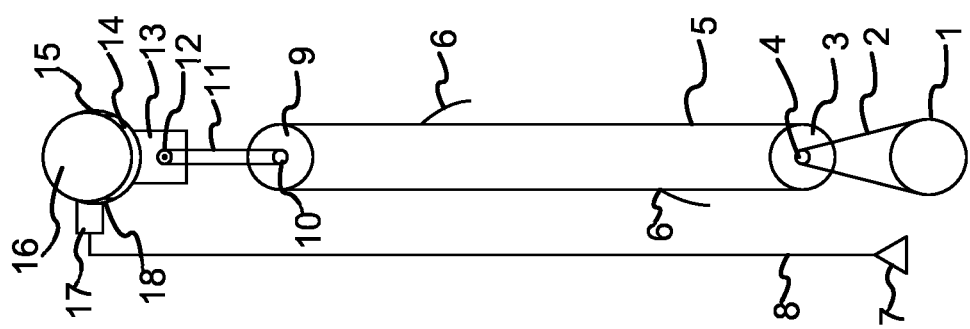
FIG. 3 depicts a top plan view of a tow system according to yet another embodiment of the present disclosure.

With reference now to FIG. 3, a tow system according to yet another embodiment of the present disclosure is configured to move people or objects from a first location to a second location, and additionally comprises a winch. At the first location, an anchor strap 2 is removably secured to an anchor point 1 as well as a fly wheel attachment rod 4. The fly wheel attachment rod 4 supports a fly wheel 3. At the second location, motor attachment/anchor straps 14 are removably secured to a motor strap attachment point 15 on an anchor point 16. The motor attachment/anchor straps 14 support a motor 13, which may comprise, for example, a gearbox. A motor drive rod 12 transfers rotational energy from the motor 13 to a drive strap or timing belt 11, which in turn transfers rotational energy to a drive wheel 9 via a drive wheel attachment rod 10. A tow strap or delivery belt 5 is operably engaged with the drive wheel 9 and the flywheel 3, so that when the motor 13 drives the drive wheel 9, the drive wheel 9 causes the tow strap or delivery belt 5 to rotate as well, which rotation is facilitated by the fly wheel 3. Also shown in FIG. 3 are flexible handle hooks 6 on the tow strap or delivery belt 5, which person(s) may grasp to be pulled by the tow strap or delivery belt 5 between the first and second locations, and/or to which one or more objects may be attached to be pulled between the first and second locations.

Also included in the embodiment of FIG. 3 is a winch 17, which is removably secured to the anchor point 16 via a winch anchor strap 18. The winch comprises a winch system rope or cable 8 terminating at a winch system handle 7. In operation, the winch 17 may be used to pull a person or object from the first location to the second location, after which the winch system handle 7 may be attached to a flexible handle hook 6 of the tow strap or delivery belt 5 to be returned to the first location.

Turning now to FIG. 4, a tow system according to still another embodiment of the present disclosure comprises a tow strap or delivery belt (portions of which are identified by reference numerals 5, 6, and 7) that runs among first, second, and third locations. At the first location, an anchor strap 2 is removably secured to an anchor point 1 as well as a fly wheel attachment rod 4. The fly wheel attachment rod 4 supports a fly wheel 3. A similar configuration is used at the third location. At the second location, one or more motor anchor straps 16, 18 removably secure a motor 15 (which may comprise, for example, a gearbox) to an anchor point 17. A motor drive rod 14 transfers rotational energy from the motor 15 to a drive strap or timing belt 13, which in turn transfers rotational energy to a drive wheel 11 via a drive wheel attachment rod 12. The portions of the embodiment of FIG. 4 described above operate in a manner that is the same as or substantially similar to the manner in which the embodiment of FIG. 2 operates.

Also included in the embodiment of FIG. 4 is a winch 10, which is secured or otherwise attached to the anchor point 17. The winch comprises a winch system rope or cable 9 terminating at a winch system handle 8. In operation, the winch 10 may be used to pull a person or object from the first location to the second location. Although not shown in FIG. 4, the tow strap or delivery belt (comprising portions 5, 6, and 7) may comprise handle hooks to which the winch system handle 8 may be attached, to return the winch system handle 8 to the first location.

Figure 5:
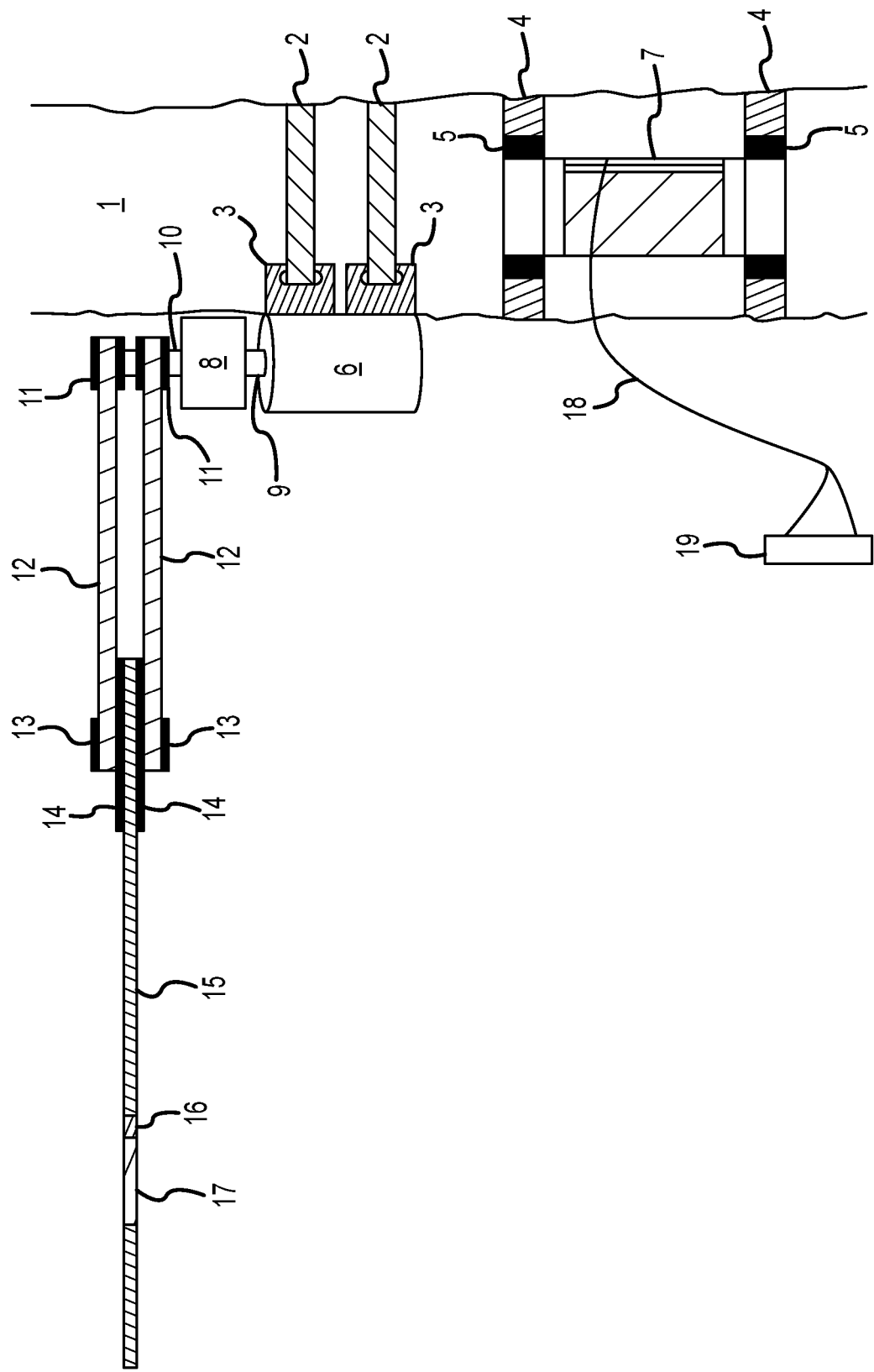
FIG. 5 depicts a side perspective of the driving portion of embodiments of the present disclosure.

With reference now to FIG. 5, an arrangement that may correspondingly be used for the embodiments of FIGS. 3 and 4 and in other embodiments of the present disclosure comprises a motor 6 secured to an anchor point 1 with motor anchor straps 2, via a motor mounting plate 3. The motor 6 is drivingly connected to a gearbox 7 via a motor drive rod 9, and the gearbox 8 is drivingly connected to a pair of drive strap or timing belt attachment rods 11 via a delivery system drive rod 10. As described previously, the tow system employs a gearbox 8 to control the application of power output from the motor 6. Conventional transmissions include a gearbox comprising one or more gears that can be selectively engaged with a power input shaft at a number of gear ratios. A person of ordinary skill in the art will appreciate that the gearbox 8 may employ manual or automatic selectivity of gearing. The crankshaft, or other rotating member or coupling, of a motor may serve as the power input shaft to the transmission. The transmission and gearbox can provide an output speed, torque, power, or other mechanical characteristic that is different from, or the same as, that provided by the motor drive rod 9 of the motor 6. The power output from the transmission is provided, in some form, to the drive strap or timing belt attachment rods 11 via a delivery system drive rod 10 of the tow system. In some embodiments, only one drive strap or timing belt attachment rod may be provided, while in others, more than two drive strap or timing belt attachment rods may be provided. The drive belt or timing belt attachment rods 11 each drive a drive strap or timing belt 12, and each drive strap or timing belt 12 engages a drive wheel attachment rod 13 that is drivingly connected to the drive wheel 14. The drive wheel 14, in turn, is drivingly connected to a tow strap or delivery belt 15, which tow strap or delivery belt 15 comprises one or more flexible handles or hooks 17 mounted to the tow strap or delivery belt 15 via a flexible handle or hook mount 16.

Also included in the embodiment of FIG. 5 is a winch 7 removably secured to the anchor point 1 with a plurality of winch anchor straps 4, via a plurality of winch mounting plates 5. In some embodiments, more or fewer winch anchor straps 4 and winch mounting plates 5 may be used than the number shown in FIG. 5. The winch 7 comprises a winch rope or cable 18 terminating at a winch handle 19.

In use, operation of the motor 6 causes the drive wheel 14 to rotate, which in turn causes the tow strap or delivery belt 15 to rotate. A person can hold onto or be attached or otherwise secured to the flexible handle or hook 17, or an object can be attached or otherwise secured to the flexible handle or hook 17. Then, as the tow strap or delivery belt 15 rotates, the tow strap or delivery belt 15 will pull the person or object toward or away from the anchor point 1 (depending on the direction of operation of the motor 6). The winch 19 may also be used to pull a person or object toward the anchor point 1. In embodiments where the anchor point 1 is higher than a second location, the winch 19 may also be used to lower a person or object away from the anchor point 1. In some embodiments, the winch handle 19 may be removably connected to the flexible handle or hook 17 of the tow strap or delivery belt 15, so as to return the winch handle 19 to a second location distal from the anchor point 1.

In an alternate embodiment, an arrangement the motor 6 is drivingly connected directly to the rod drive strap or timing belt attachment rods 11 via a delivery system drive rod 10 without use of a gearbox. Such a configuration may serve to alleviate issues of torque and leverage when employing a motor 6 drivingly connected to a gearbox 8 and delivery system drive rod 10. Further, the motor 9 may be a brushless direct current (DC) electric motor connected to the one or more rechargeable batteries described in more detail below. Further, the motor 9 may be controlled by a power output control unit. The power output control unit may be controllable by a person directly through a graphical user interface (UI) located on the tow system or through one or more mobile cellular devices communicably connected to the tow system.

Figure 6:
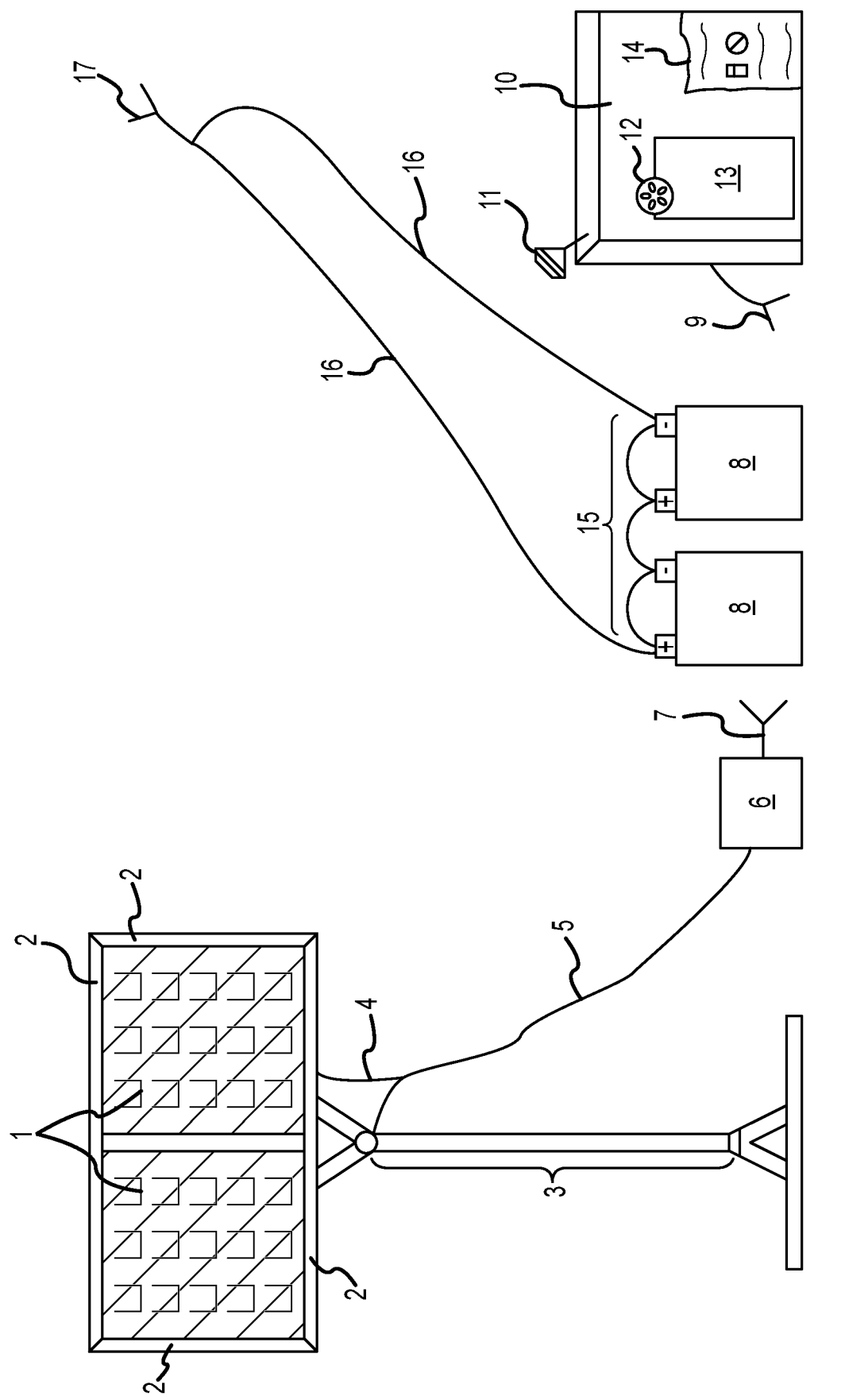
FIG. 6 depicts a diagram of energy generation and storage equipment according to some embodiments of the present disclosure.

Turning now to FIG. 6, an energy source arrangement for any of the tow systems described herein may comprise, for example, one or more photovoltaic panels 1 mounted to a panel frame 2 that is supported by a photovoltaic support 3. The photovoltaic panels 1 may be any panels useful for converting solar energy into electricity. The electricity generated by the photovoltaic panels 1 passes through the cables 4 and 5 to the photovoltaic energy convert 6, from which appropriately conditioned electricity may be provided to a motor or winch of a tow system according to embodiments of the present disclosure via a cable 7.

Similarly, electrical energy for operation of a motor or winch of a tow system according to embodiments of the present disclosure may be stored in one or more batteries 8 of a battery bank system 15. Cables 16 and 17 may be used to establish an electrical connection between the batteries 8 and a motor and/or winch of a tow system according to embodiments of the present disclosure.

A power generator 10 comprising a fuel reservoir 13 (accessible via a fuel cap 12), a control panel 14, and a pull start 11 may also be used to generate electricity for use by a motor and/or winch of a tow system according to embodiments of the present disclosure. The power generator 10 may comprise, for example, a gas-powered engine configured to burn fuel from the fuel reservoir 13 and to drive a generator, which generator may produce electrical current for transmission via the cable 9.

In some embodiments, the electrical energy generated by the photovoltaic panels 1 may be used to charge the batteries 8 of the battery bank system 15, and may be received at the batteries 8 via the cable 7. In the same or in other embodiments, the electrical energy generated by the generator 10 may also be used to charge the batteries 8 of the battery bank system 15 and may be received at the batteries via the cable 9. While some embodiments of the present disclosure may comprise solar panels, batteries, and a fuel-powered generator for providing power to the tow system, other embodiments may comprise fewer than all these components, while still other embodiments may comprise other or additional energy generation or energy storage equipment.

The preceding description and FIG. 6 may include various battery management systems directed to a lead-acid storage battery or a system including a plurality of lead-acid batteries connected in series to the tow system 15. Also to be connected to the energy source arrangement for any of the tow systems described herein may comprise, for example, separate DC chargers for each battery, a sensory system for monitoring the batteries, an auxiliary power supply, various electrical connections permitting the system to be powered by a central or bulk charger, and instrumentation such as a programmed central processing unit (CPU) and microcontroller processors located at each battery for performing various battery management functions. The CPU or other instrumentation records data from the sensory system, displays the data, coordinates charging of the individual batteries by the bulk charger and the individual DC chargers, processes input data, and generates various control signals to permit the management of the lead-acid batteries. It will be recognized that other specific systems of the invention for other specific lead-acid battery systems, nickel-cadmium battery systems, or other types of rechargeable batteries may typically require different operating voltages, operating conditions, and electrical components other than those described herein. Further, the energy collection and delivery of the battery or batteries may be controlled by a power output control unit. The power output control unit may be controllable by a person directly through a graphical user interface (UI) located on the tow system or through one or more mobile cellular devices communicably connected to the tow system.

Figure 7:
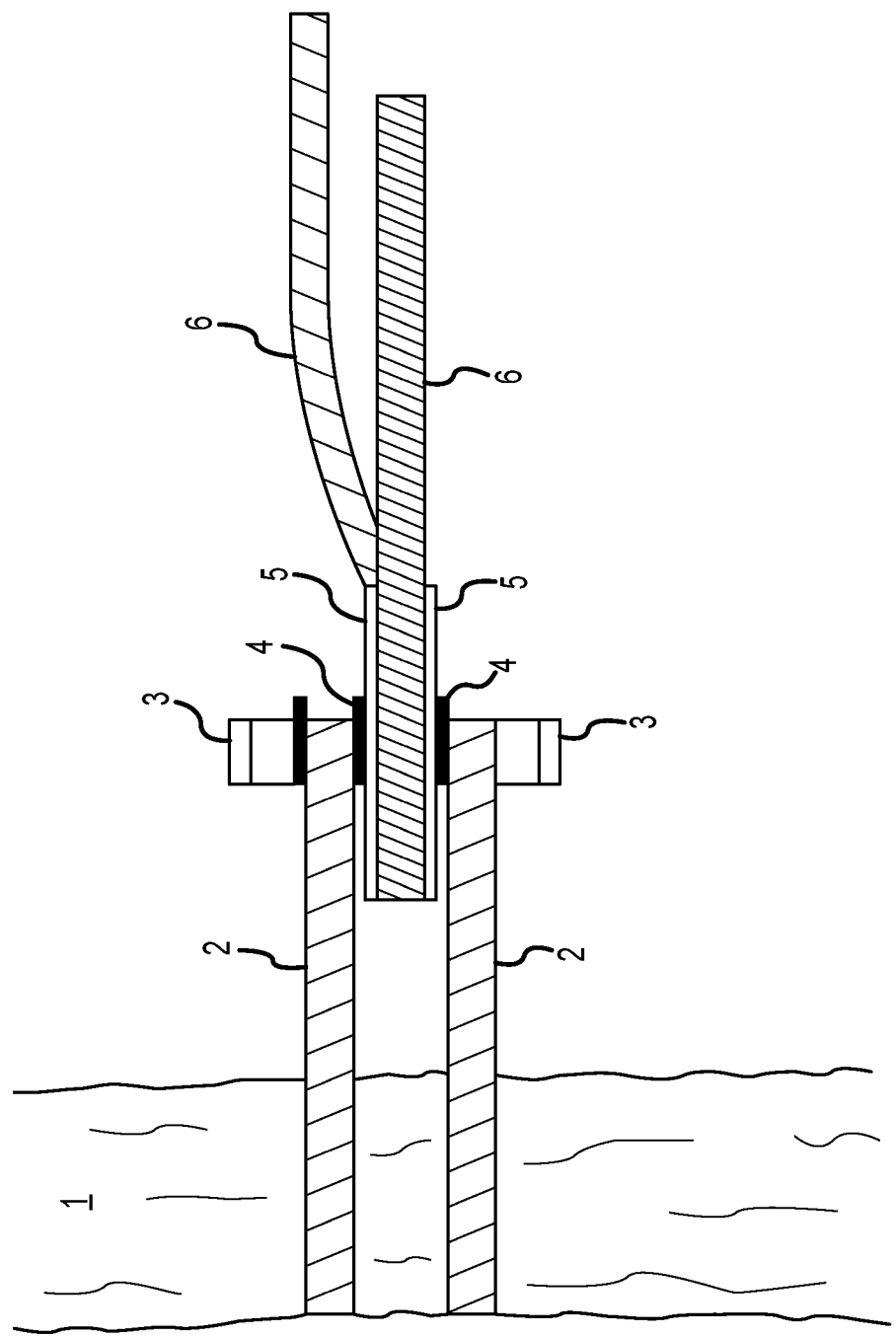
FIG. 7 depicts a side perspective view of the flywheel portion of embodiments of the present disclosure.

A fly wheel 5 such as the fly wheels described above in connection with FIGS. 1-4 may be secured to an anchor point 1 as depicted in FIG. 7. Specifically, one or more fly wheel anchor straps 2 may removably secure a fly wheel attachment rod 3 to the anchor point 1, via a fly wheel attachment strap housing. A flywheel 5 is mounted on the flywheel attachment rod 3, and is engaged with a tow system delivery strap or belt 6. The tow system delivery strap or belt 6 pulls on the fly wheel 5, which in turn pulls the fly wheel anchor straps 2 taut. The force exerted on the fly wheel 5 by the tow system delivery strap or belt therefore ensures that the fly wheel 5 remains supported against the force of gravity.

Figure 8:
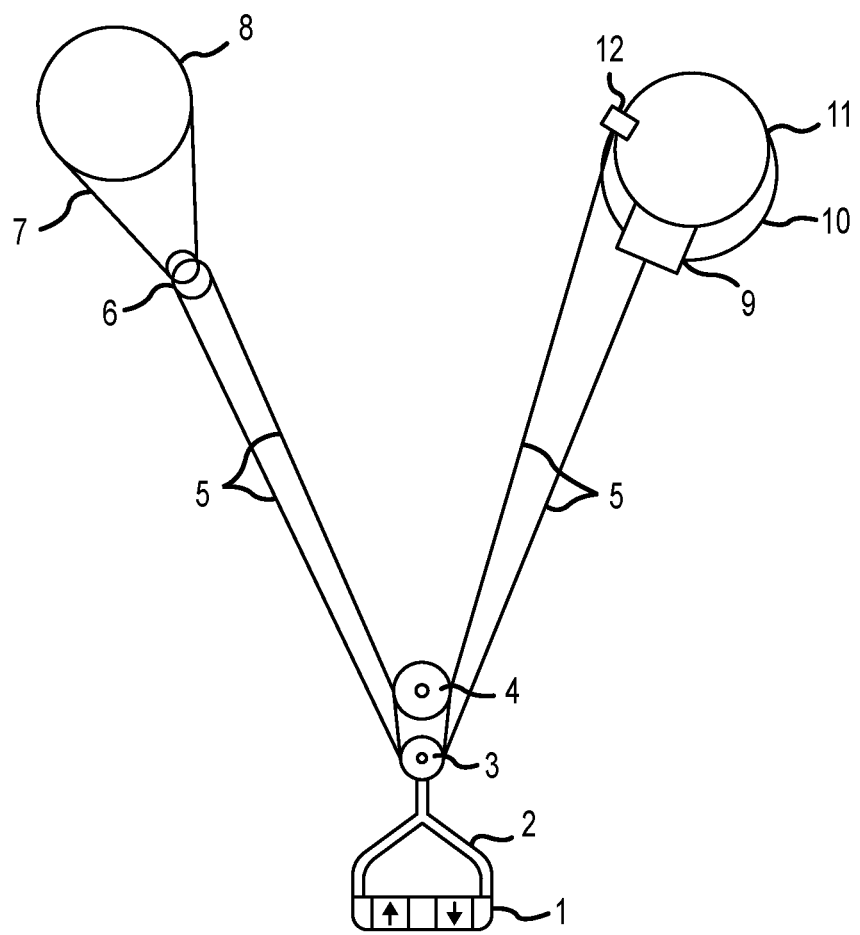
FIG. 8 depicts a diagram of a winch arrangement according to embodiments of the present disclosure.

FIG. 8 depicts a winch arrangement in which a winch controller/tow handle 1 comprises buttons, switches, or other controls for operation of a radio-controlled or remote-controlled winch 9. The winch controller/tow handle 1 may operate in any known manner to transmit control signals to the radio-controlled or remote-controlled winch 9. The radio-controlled or remote-controlled winch 9 is removably secured to an anchor point 11 via one or more winch anchor straps 10. The winch controller/tow handle 1 also comprises a tow handle pulley connection 2, through which the winch controller/tow handle 1 is connected to tow handle pulleys 3 and 4. A tow cable or rope 5 extends from the radio-controlled or remote-controlled winch 9, around the tow handle pulley 3, around an individual anchor pulley 6 that is removable secured to an anchor point 8 via an anchor strap 7, and around the tow-handle pulley 4, before terminating at an anchor point connection 12 on the anchor point 11. By including the tow handle pulleys 3 and 4, the force required to pull a person or object holding onto or otherwise attached to the tow handle 1 is substantially reduced, allowing the use of a less powerful winch (or, alternatively, enabling the winch to pull a heavier load).

Figure 9:
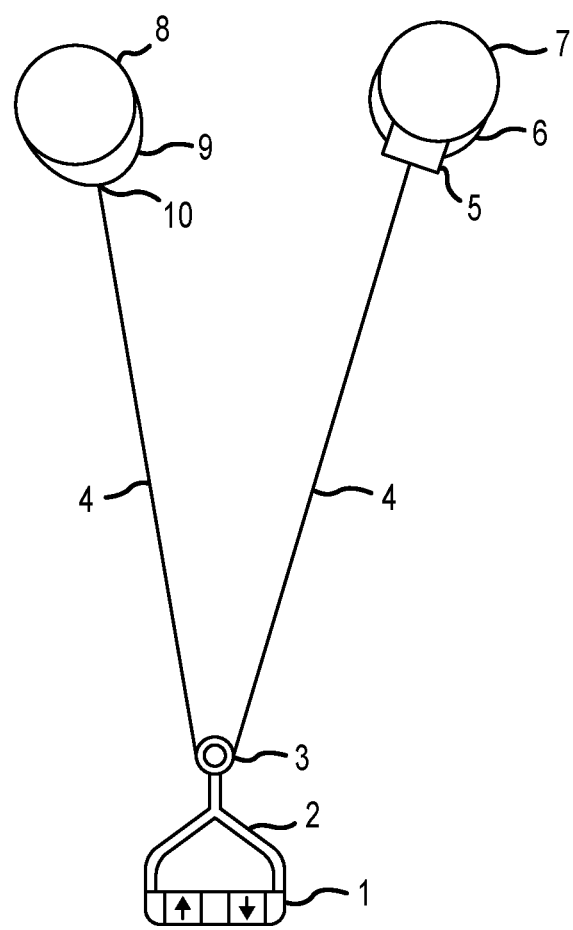
FIG. 9 depicts a diagram of a winch arrangement according to other embodiments of the present disclosure.

FIG. 9 also depicts a winch arrangement in which a winch controller or tow handle 1 comprises buttons, switches, or other controls for operation of a radio-controlled or remote-controlled winch 5. The winch controller or tow handle 1 may operate in any known manner to transmit control signals to the radio-controlled or remote-controlled winch 5. The radio-controlled or remote-controlled winch 5 is removably secured to an anchor point 7 via one or more winch anchor straps 6. The winch controller/tow handle 1 also comprises a tow handle pulley connection 2, through which the winch controller/tow handle 1 is connected to tow handle pulley 3. A tow cable or rope 4 extends from the radio-controlled or remote-controlled winch 5 and around the tow handle pulley 3 before terminating at an anchor point connection 10, which is removably secured to an anchor point 8 via one or more anchor point straps 9. By including the tow handle pulley 3, the force required to pull a person or object holding onto or otherwise attached to the tow handle 1 is substantially reduced (although not as much as in the embodiment of FIG. 8), allowing the use of a less powerful winch (or, alternatively, enabling the winch to pull a heavier load).

Certain embodiments described herein may employ one or more user access restriction devices. For example, a user of the tow system may access the tow system via one or more radio frequency identification (RFID) tags. RFID is a generic term for technologies using radio waves to automatically identify people or objects. There are several methods of identification, but the most common is to store a serial number that identifies a person or object, and perhaps other information, on a microchip that is attached to an antenna (the chip and the antenna together are called an RFID transponder or an RFID tag). The antenna enables the chip to transmit the identification information to a reader. The reader converts the radio waves reflected back from the RFID tag into digital information that can then be passed on to computers that can make use of it.

An RFID system consists of a tag, which is made up of a microchip with an antenna, and an interrogator or reader with an antenna. The reader sends out electromagnetic waves. The tag antenna is tuned to receive these waves. A passive RFID tag draws power from field created by the reader and uses it to power the microchip's circuits. The chip then modulates the waves that the tag sends back to the reader and the reader converts the new waves into digital data.

Active RFID tags have a battery, which is used to run the microchip's circuitry and to broadcast a signal to a reader (the way a cell phone transmits signals to a base station). Passive tags have no battery. Instead, they draw power from the reader, which sends out electromagnetic waves that induce a current in the tag's antenna. Semi-passive tags use a battery to run the chip's circuitry, but communicate by drawing power from the reader. Active and semi-passive tags are useful for tracking high-value goods that need to be scanned over long ranges, such as railway cars on a track, but they cost a dollar or more, making them too expensive to put on low-cost items. Companies are focusing on passive UHF tags, which cost less than 50 cents today in volumes of 1 million tags or more. Their read range isn't as far—typically less than 20 feet vs. 100 feet or more for active tags—but they are far less expensive than active tags and can be disposed of with the product packaging.

Passive and active RFID transponders or tags contain coiled antennas to enable them to receive and respond to radio-frequency queries from an RFID reader or transceiver (which also includes an antenna). The transceiver converts the radio waves returned from the RFID tag into a form that can be passed onto computers. Typically, a serial number that identifies a product uniquely, and sometimes other information, is stored on the RFID tag (which typically can store up to 2 KB of data). Passive RFID tags do not have a power supply. A minute electrical current induced in an antenna by the incoming radio-frequency scan provides enough power for the tag to send a response. Active RFID tags have an on-board power source and may have longer ranges and larger memories than passive tags and the ability to store additional information sent by the transceiver. Semi-passive RFID tags use an on-board power source to run the tag's circuitry but communicate by drawing power from the transceiver. Chips in RFID tags can be read-write or read-only.

Other examples of user access restriction devices employed in certain embodiments described herein may comprise one or more magnetic card readers, code entry pads, credit card readers, or any combinations of the foregoing.

A number of variations and modifications of the foregoing disclosure can be used. It would be possible to provide for some features of the disclosure without providing others.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A10 Fusion processor with 64-bit architecture, Apple® M10 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, and ARM® Cortex-A and ARM926EJ-S™ processors. A processor as disclosed herein may perform computational functions using any known or future-developed standard, instruction set, libraries, and/or architecture.

I claim:

1. A tow system, comprising:
    a motor removably mounted to a first anchor point, the motor drivingly connected to a drive wheel attachment rod via a drive belt;
    a drive wheel connected to the drive wheel attachment rod and configured to be driven by the drive belt;
    a flywheel removably secured to a second anchor point distal from the first anchor point;
    a tow strap extending around the drive wheel and around the flywheel, the tow strap configured to be driven by the drive wheel and to drive the flywheel; and
    a winch removably secured to the first anchor point, the winch comprising a winch cable and terminating in a winch handle.

2. The tow system of claim 1, further comprising a second flywheel removably secured to a third anchor point distal from the first and second anchor points, and wherein the tow strap further extends around the second flywheel and is configured to drive the second flywheel.

3. The tow system of claim 1, further comprising a battery for supplying power to the motor.

4. The tow system of claim 3, further comprising a photovoltaic panel configured to convert solar energy into electrical energy, the photovoltaic panel in electrical communication with the battery for charging the battery.

5. The tow system of claim 3, further comprising a fuel-powered generator configured to generate electricity, the fuel-powered generator in electrical communication with the battery for charging the battery.

6. The tow system of claim 1, wherein the motor comprises at least one mounting plate and further wherein the motor is removably mounted to the first anchor point with at least one anchor strap via the at least one mounting plate.

7. The tow system of claim 1, wherein the motor is drivingly connected to a gearbox, and the gearbox is drivingly connected to a delivery system drive rod.

8. The tow system of claim 1, wherein the tow strap comprises at least one handle extending therefrom.

9. The tow system of claim 1, wherein the winch is removably secured to the first anchor point with at least one anchor strap.

10. The tow system of claim 1, wherein the winch is configured to be controlled via radio control signals, and further wherein the winch handle comprises a control unit, the control unit comprising at least one control interface and a transmitter for selectively transmitting radio control signals.

11. The tow system of claim 1, further comprising at least one access restriction device, wherein the user access restriction device permits the use of the tow system by a select population of users.

12. The tow system of claim 11, wherein the at least one access restriction device comprises one or more radio frequency identification tags.

13. The tow system of claim 1, further comprising:
    a braking arrangement; and
    a throttle, wherein the throttle is controlled by one or more power output control units, and wherein the one or more power output control units is accessible by a user through a graphical user interface (UI) or through one or more mobile cellular devices communicably connected to the tow system.

14. The tow system of claim 3, further comprising:
    a battery management system, wherein the battery management system comprising:
    a plurality of lead-acid batteries connected in series to the tow system;
    a plurality of direct current (DC) chargers for each of the plurality of lead-acid batteries;
    a sensory system for monitoring the plurality of lead-acid batteries;
    an auxiliary power supply,
    one or more electrical connections powering the tow system by a charger; and
    a central processing unit (CPU) in communication plurality of lead-acid batteries.

15. A method of employing a portable tow system, the tow system comprising:
    a motor removably mounted to a first anchor point, the motor drivingly connected to a drive wheel attachment rod via a drive belt, wherein the motor comprises at least one mounting plate and further wherein the motor is removably mounted to the first anchor point with at least one anchor strap via the at least one mounting plate, wherein the motor is drivingly connected to a gearbox, and the gearbox is drivingly connected to a delivery system drive rod;
    a drive wheel connected to the drive wheel attachment rod and configured to be driven by the drive belt;
    a flywheel removably secured to a second anchor point distal from the first anchor point;
    a tow strap extending around the drive wheel and around the flywheel, the tow strap configured to be driven by the drive wheel and to drive the flywheel, wherein the tow strap comprises at least one handle extending therefrom; and
    a winch removably secured to the first anchor point, the winch comprising a winch cable and terminating in a winch handle.

16. The method of employing a portable tow system of claim 15, the tow system further comprising:
    a winch removably secured to the first anchor point, the winch comprising a winch cable and terminating in a winch handle, wherein the winch is removably secured to the first anchor point with at least one anchor strap; and
    a second flywheel removably secured to a third anchor point distal from the first and second anchor points, and wherein the tow strap further extends around the second flywheel and is configured to drive the second flywheel.

17. The method of employing a portable tow system of claim 16, the tow system further comprising:
- a battery for supplying power to the motor,
- a battery management system, wherein the battery management system comprising:
- a plurality of lead-acid batteries connected in series to the tow system;
- a plurality of direct current (DC) chargers for each of the plurality of lead-acid batteries;
- a sensory system for monitoring the plurality of lead-acid batteries;
- an auxiliary power supply,
- one or more electrical connections powering the tow system by a charger; and
- a central processing unit (CPU) in communication plurality of lead-acid batteries.

18. The method of employing a portable tow system of claim 17, the tow system further comprising:
- at least one access restriction device, wherein the user access restriction device permits the use of the tow system by a select population of users, and wherein the at least one access restriction device comprises one or more radio frequency identification tags.

19. The method of employing a portable tow system of claim 15, the tow system further comprising:
- a braking arrangement; and
- a throttle.

20. A tow system, comprising:
- a first anchor point;
- a drive wheel, wherein the drive wheel comprises an inner radius and an outer radius;
- a motor removably mounted to both the first anchor point and within the inner radius of the drive wheel, the motor drivingly connected to the inner radius of the drive wheel;
- a flywheel removably mounted to a second anchor point distal from the first anchor point;
- a tow strap extending around the drive wheel and around the flywheel, the tow strap configured to be driven by the drive wheel and to drive the flywheel; and
- a winch removably secured to the tow system, the winch comprising a winch cable and terminating in a winch handle.

* * * * *